(12) United States Patent
Schulz (10) Patent No.: US 7,151,532 B2
(45) Date of Patent: Dec. 19, 2006

(54) MULTIFUNCTIONAL MULTILAYER OPTICAL FILM

(75) Inventor: Stephen C. Schulz, Lee, NH (US)

(73) Assignee: 3M Innovative Properties Company, St. Paul, MN (US)

( * ) Notice: Subject to any disclaimer, the term of this patent is extended or adjusted under 35 U.S.C. 154(b) by 508 days.

(21) Appl. No.: 10/216,507

(22) Filed: Aug. 9, 2002

(65) Prior Publication Data

US 2004/0027339 A1 Feb. 12, 2004

(51) Int. Cl.
*G09G 5/00* (2006.01)

(52) U.S. Cl. ..................... 345/173; 345/179

(58) Field of Classification Search ........ 345/173–178, 345/179; 427/164–167, 255; 428/426–428
See application file for complete search history.

(56) References Cited

U.S. PATENT DOCUMENTS

| | | | |
|---|---|---|---|
| 4,308,316 A | 12/1981 | Gordon | |
| 4,371,746 A | 2/1983 | Pepper, Jr. | |
| 4,595,634 A | 6/1986 | Gordon | |
| 4,847,157 A | 7/1989 | Goodman et al. | |
| 4,853,257 A | 8/1989 | Henery | |
| 4,946,712 A | 8/1990 | Goodman et al. | |
| 5,573,335 A * | 11/1996 | Schinazi | 374/141 |
| 5,773,086 A | 6/1998 | McCurdy et al. | |
| 5,792,550 A * | 8/1998 | Phillips et al. | 428/336 |
| 5,846,649 A * | 12/1998 | Knapp et al. | 428/334 |
| 6,048,796 A * | 4/2000 | Wang et al. | 438/692 |
| 6,087,012 A | 7/2000 | Varaprasad et al. | |
| 6,106,892 A | 8/2000 | Ye | |
| 6,248,397 B1 | 6/2001 | Ye | |
| 6,476,783 B1 * | 11/2002 | Matthies et al. | 345/82 |
| 6,480,250 B1 * | 11/2002 | Matsufuji et al. | 349/113 |
| 6,507,337 B1 * | 1/2003 | Sato et al. | 345/173 |
| 6,583,935 B1 * | 6/2003 | Saif et al. | 359/582 |
| 6,677,703 B1 * | 1/2004 | Ito et al. | 313/478 |
| 6,686,546 B1 * | 2/2004 | Chiu | 178/18.01 |
| 6,688,186 B1 * | 2/2004 | Chae | 73/862.624 |
| 6,727,566 B1 * | 4/2004 | Fukui et al. | 257/437 |
| 6,896,981 B1 * | 5/2005 | Iwabuchi et al. | 428/698 |
| 6,987,354 B1 * | 1/2006 | Arakawa et al. | 313/506 |
| 2001/0028343 A1 * | 10/2001 | Bottari et al. | 345/173 |
| 2001/0055673 A1 | 12/2001 | Getz | |
| 2002/0155299 A1 * | 10/2002 | Harris et al. | 428/428 |
| 2002/0167629 A1 * | 11/2002 | Blanchard | 349/112 |
| 2003/0071794 A1 * | 4/2003 | Arakawa et al. | 345/173 |
| 2003/0222857 A1 * | 12/2003 | Abileah | 345/173 |

FOREIGN PATENT DOCUMENTS

| | | |
|---|---|---|
| EP | 1 172 831 A2 | 1/2002 |
| GB | 2355273 | 4/2001 |
| JP | 07-315880 | 12/1995 |
| JP | 07315880 | 12/1995 |
| JP | 08-138446 | 5/1996 |
| JP | 08138446 | 5/1996 |
| WO | 0229830 | 4/2002 |

* cited by examiner

*Primary Examiner*—Richard Hjerpe
*Assistant Examiner*—Jean Lesperance
(74) *Attorney, Agent, or Firm*—Robert J. Pechman (57) ABSTRACT

Optical component for use in a touch sensor and method of fabrication of same are disclosed. Optical component includes a multilayer optical film at least some layers of which are fabricated on the same manufacturing line and using the same manufacturing method. Each layer of the multilayer optical film is designed primarily to provide a desired associated property.

13 Claims, 8 Drawing Sheets

MULTIFUNCTIONAL MULTILAYER OPTICAL FILM

FIELD OF THE INVENTION

This invention generally relates to touch sensing devices. The invention is particularly applicable to such devices used in electronic display systems.

BACKGROUND

Touch screens allow a user to conveniently interface with an electronic display system by reducing or eliminating the need for a keyboard. For example, a user can carry out a complicated sequence of instructions by simply touching the screen at a location identified by a pre-programmed icon. The on-screen menu may be changed by re-programming the supporting software according to the application.

Resistive and capacitive are two common touch sensing technologies. Both technologies typically incorporate one or more transparent conductive films as part of an electronic circuit that detects the location of a touch.

The performance of a touch screen is described in terms of various characteristics of the screen. One such characteristic is optical transmission. Image brightness and contrast increase as a touch screen's optical transmission is improved. High optical transmission is particularly desired in portable devices where the display is often powered by a battery with limited lifetime. Optical transmission may be optimized by improving optical clarity of different layers in the touch screen, and by reducing reflection at various interfaces. Typically, anti-reflection coatings are used to reduce reflection losses.

Another characteristic of a touch screen is the amount of glare. Polished surfaces in a touch screen specularly reflect ambient light towards a viewer. Such specular reflection is generally referred to as glare and will reduce the viewability of the displayed information. Glare from a polished surface is typically reduced by making the surface optically diffusive. Such diffuse surface is sometimes referred to as a matte or rough surface. Glare may also be reduced by coating the polished surface with a film having a matte or rough surface. Such coating is sometimes referred to as an anti-glare coating.

Another characteristic of a touch screen is durability. Generally, touch screens are susceptible to physical damage such as scratching. A user may use a stylus, finger, pen, or any other convenient touch implement to apply a touch. The ability of a touch screen to resist scratching affects screen durability, and hence, screen lifetime. Typically, a touch screen's durability is improved by coating surfaces that are susceptible to scratching with a scratch-resistant film. Such a film is sometimes referred to as an abrasion resistant film.

Another characteristic of a touch screen is overall cost. Generally, manufacturing cost increases as the number of layers in a touch screen is increased. As one screen characteristic is improved, one or more other characteristics often degrade. For example, in an attempt to reduce manufacturing cost, the number of layers in a touch screen may be reduced, hence, compromising other properties of the touch screen such as durability, optical transmission, or contrast. As a result, certain tradeoffs are made in a touch screen in order to best meet the performance criteria for a given application. Therefore, there remains a need for touch screens with improved overall performance.

SUMMARY OF THE INVENTION

Generally, the present invention relates to touch sensors and touch sensing displays where it is desirable to have a set of desired properties with no or little trade off and where it is further desirable to reduce manufacturing cost.

In one aspect of the invention a method of manufacturing a touch sensor component includes manufacturing a glass substrate followed by using atmospheric pressure chemical vapor deposition to deposit at least four films onto the glass substrate where the first film is designed primarily to have a desired optical clarity and sheet resistance, the second film is designed primarily to isolate the first film from the substrate, the third film is designed primarily to resist abrasion, and the fourth film is designed primarily to reduce glare.

In another aspect of the invention a method of manufacturing an optical component for use in a touch sensor includes using the same deposition technique to form a multilayer optical film onto a glass substrate all fabricated on the same manufacturing line where the multilayer optical film includes a first film designed primarily to have a desired optical clarity and sheet resistance, a second film is designed primarily to isolate the first film from the substrate, and a third film is designed primarily to provide a desired resistance to abrasion.

In another aspect of the invention a method of manufacturing a multilayer optical film for use in a touch sensor includes forming a glass substrate on a manufacturing line, and on the same manufacturing line and using the same film deposition technique to deposit a transparent conductive film primarily designed to provide a desired optical transmission and sheet resistance, and a barrier film designed primarily to isolate the conductive film from the substrate.

In another aspect of the invention an optical component for use in a touch sensor includes a substrate manufactured using a float technology, and at least three films formed onto the substrate using the same technology where at least a first film is designed primarily to provide a desired optical clarity and conductivity, at least a second film is designed primarily to isolate the first film from the substrate, and at least a third film is designed primarily to provide resistance to abrasion.

In another aspect of the invention a touch sensitive display includes a float glass substrate and at least four films formed onto the glass substrate using an atmospheric pressure chemical vapor deposition technique where the first film is designed primarily for a pre-determined optical clarity and electrical conductivity, the second film is designed primarily for isolating the first film from the substrate, the third film is designed primarily for resisting abrasion, and the fourth film is designed primarily to reduce glare.

BRIEF DESCRIPTION OF DRAWINGS

The invention may be more completely understood and appreciated in consideration of the following detailed description of various embodiments of the invention in connection with the accompanying drawings, in which.

DETAILED DESCRIPTION

The present invention is generally applicable to touch screens, touch screens used with electronic display systems, and particularly where it is desirable for a touch screen to have high optical transmission, high contrast, high durability, low glare, low reflection, and low manufacturing cost. The present invention allows the optimization of a touch screen's desirable properties with no or little trade off. The present invention, furthermore, describes implementation of some of the listed desirable properties into a single layer, thereby further reducing design and manufacturing costs.

A touch screen can work on the general principle that an otherwise open electrical circuit is closed when a touch is applied. The properties of a signal generated in the closed circuit allows detection of a touch location. Different technologies may be employed to detect a touch location. One such technology is resistive. In a resistive touch, an applied touch brings two otherwise physically separated conductive films into direct physical contact with one another. The physical contact closes an otherwise open electronic circuit, thereby resulting in generation of a resistively coupled electrical signal. The properties of the generated signal allow detection of the touch location.

Capacitive is another technology commonly used to detect the location of a touch. In this case, a signal is generated when a conductive touch applicator, such as a user's finger, is brought sufficiently close to a conductive film to allow capacitive coupling between the two conductors. The two conductors are electrically connected to each other, for example, through the earth ground. Properties of the generated signal allow detection of the touch location. Other viable technologies include surface acoustic wave, infrared, and force.

The present invention is applicable to touch sensing screens where it is desirable for a touch screen to be scratch resistant, have low glare, low reflection, high optical transmission, and low manufacturing cost. The present invention is particularly applicable to touch screens utilizing resistive or capacitive technologies to detect the location of a touch. For example, one embodiment of the present invention is well suited for use in a capacitive touch screen where it is desirable to have optimized abrasion resistance and anti-reflection properties with reduced manufacturing cost. Another embodiment of the present invention is particularly suitable for use in a resistive touch screen where it is desirable for the conductive sheets to have optically diffuse surfaces with reduced manufacturing cost.

According to the present invention the overall performance of a touch sensor can be improved by designing each layer primarily to provide a particular characteristic of the touch sensor at a desired level. For example, a given layer in the touch sensor can be designed primarily to provide a pre-determined optical transmission and sheet resistance. A different layer can be designed primarily to provide a pre-determined minimum resistance to abrasion, and yet a different layer can be designed principally to reduce glare.

According to the present invention, where two or more desired characteristics in a touch sensor can not at the same time be effectively provided for by designing a single, multifunctional layer, each characteristic is provided for by designing a separate layer dedicated primarily to providing that characteristic at a pre-determined level. For example, a conventional capacitive touch sensor typically incorporates an abrasion resistant film to protect a transparent conductive sheet from damage due to repeated touches. Typically the same film is also designed to reduce reflection. However, the optimum design values for the two characteristics of resistance to abrasion and reduced reflection typically require a compromise in one or both characteristics. For example, effective abrasion resistant materials tend to have a higher index of refraction than materials used to reduce reflection. In addition, a design to provide resistance to abrasion typically requires a film thickness that can be substantially different than a design that effectively reduces reflection. As a result, it is difficult for a single film to simultaneously provide sufficient resistance to abrasion and reduction in reflection. According to the present invention, a first layer can be designed primarily to provide sufficient abrasion resistance and a second layer can be designed primarily to reduce glare. The two layers can have different indices of refraction, thickness, and material composition.

According to the present invention, the potential increase in manufacturing cost due to an increase in the number of layers can be mitigated by sequentially depositing at least some of the constituent layers on the same manufacturing line. For example, the coatings can be applied to a glass substrate during the glass manufacturing process. For example, the coatings can be applied to a hot float glass in or subsequent to the float bath. U.S. Pat. Nos. 6,106,892 and 6,248,397 disclose deposition of a silicon oxide coating on hot glass. U.S. Pat. No. 5,773,086 discloses deposition of an indium oxide coating to the surface of a hot glass. In one particular embodiment of the present invention, a multilayer optical component is manufactured that includes the following steps. First, a glass substrate is manufactured on a float bath. Second, while on the bath or after removing the glass substrate from the bath a barrier layer of silicon dioxide or tin oxide is deposited onto the hot glass substrate using atmospheric pressure chemical vapor deposition (APCVD). Next, a layer of transparent conductor such as a fluorine doped tin oxide is deposited onto the barrier layer. The transparent conductor is primarily designed to have a pre-determined optical clarity and sheet resistance. The barrier layer is designed primarily to isolate the transparent conductor from the float glass. Finally, an anti-reflective film coating is deposited onto the transparent conductor film using APCVD, where the anti-reflective film coating is designed primarily to reduce reflection to a desired level. It will be appreciated that additional layers can be deposited on the same or a different manufacturing line using APCVD or a different manufacturing technique to provide additional functionalities.

Figure 1:
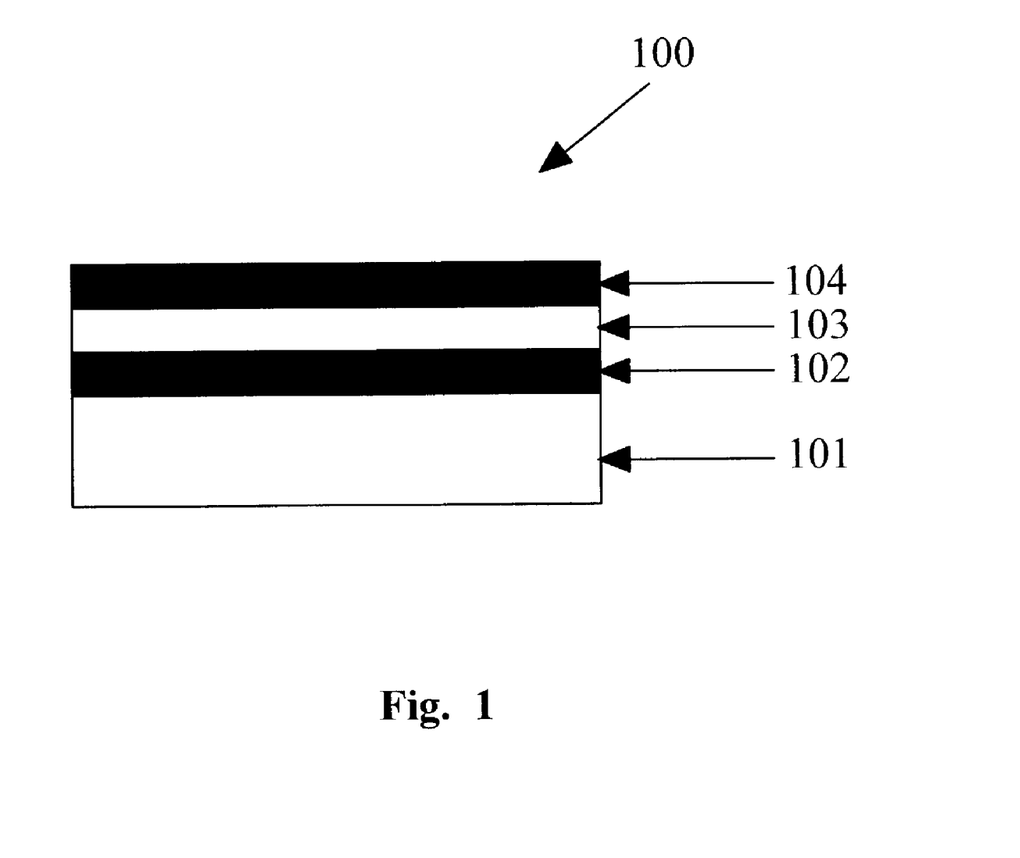
FIG. 1 illustrates a schematic side view of an optical component in accordance with an embodiment of the invention.

FIG. 1 illustrates a schematic cross-section of a multilayer optical film 100 in accordance with one particular embodiment of the present invention. Optical film 100 is a component suitable, for example, for use in a touch sensor. Optical film 100 includes a substrate 101, a transparent conducting film 102, an abrasion resistant film 103, and an anti-reflection film 104. Substrate 101 may be flexible or rigid. Substrate 101 is preferably highly optically transmissive. Transparent conductive film 102 is designed primarily to provide a desired optical clarity, sheet resistance, and sheet resistance uniformity. Abrasion resistant film 103 is designed primarily to provide optimum protection against abrasion. Anti-reflective film 104 is designed primarily to reduce reflection to a desired level by using light interference. The different films in optical film 100 may each be a single layer or multiple layers. For example, anti-reflective film 104 may include one or more layers of high and low indices of refraction. Suitable materials for anti-reflective film 104 include materials having a low index of refraction, for example, in the range of 1.35 to 1.5, although in some applications other indices of refraction can be used. In addition, the optical thickness of each layer in the anti-reflective film film, where the optical thickness is defined as the product of the physical thickness and index of refraction of the layer, is typically close to a quarter of a wave, for example, in the 50 to 150 nanometer range, although thinner or thicker films can also be used depending on the application. Materials particularly suitable for abrasion resistant film 103 typically have a high index of refraction, for example, in the range of 1.6 to 2.7, although in some applications other indices of refraction can be used. In addition, in order to provide adequate resistance to abrasion, the abrasion resistant film should be sufficiently thick, and a sufficient thickness may or may not be much larger than a quarter wave.

To reduce manufacturing cost, it is common in known constructions for a single film to be designed to provide two or more properties. As discussed above, however, this approach often requires conflicting design parameters which can result in reduced performance. For example, if in the optical film 100 of FIG. 1 a single film is designed to provide the properties of resistance to abrasion and reduced reflection, the potential conflicting requirements of material composition, index of refraction, and thickness often result in a compromise in one or both properties. More specifically, for example, the thickness of abrasion resistant film 103, designed primarily to provide sufficient abrasion, may have to be larger than the thickness of anti-reflective film 104, designed primarily to reduce reflection to a desired level. In addition, the index of refraction of abrasion resistant film 103 is typically larger than that of the anti-reflective film 104. Therefore, if a single film was designed to provide anti-abrasion and anti-reflection properties, a compromise would need to be made. The present invention alleviates the need for this compromise by designing abrasion resistant film 103 primarily to provide a desired resistance to abrasion, and anti-reflective film 104 primarily to reduce reflection. Therefore, in the present invention, each of these properties are independently provided by separate films, each of which is designed primarily to provide a specific property to the desired level without particular concern for the compromise that is often required when attempting to provide multiple functionalities in fewer layers.

While each of the films described in the present invention is primarily responsible for providing its associated properties in an overall construction, the films may contribute to properties for which they were not primarily designed. For example, the abrasion resistant film may contribute to reducing reflection even though the antireflective film is designed to be the primary provider of anti-reflection functionality.

As another example, the thickness of transparent conductive film 102, designed primarily to provide optical clarity and conductivity, is generally different than the thickness of anti-reflective film 104 designed primarily to reduce reflection. To reduce manufacturing cost, in known constructions a single film is typically designed to provide properties of conductivity and reduced reflection. However, since each property generally requires a different thickness, at least one of the two properties remains at an undesired level. The present invention allows optimization of both properties by designing a separate film 102 to provide a desired clarity and conductivity, and another film 104 to minimize reflection.

As discussed, manufacturing cost of optical film 100 can be reduced by coating most or all the films in optical film 100 on the same suitable manufacturing line. Exemplary manufacturing methods include chemical vapor deposition (CVD), APCVD, vacuum deposition (such as evaporation or sputtering), solvent-based coating, cast and cure, and other similar coating techniques.

APCVD is particularly advantageous when substrate 101 is made of glass. In this case, layers 102, 103, and 104 can be coated on the same general line where the glass substrate is manufactured, thereby reducing cost. The layers can be sequentially deposited, for example at different coating stations, at elevated temperatures on a hot glass substrate. Deposition at elevated temperatures and on a hot substrate can be particularly advantageous because such conditions tend to improve optical, electrical, and durability properties of the deposited films. Durability includes mechanical, processing, and environmental durability. Alternatively, films 102 and 103 can be deposited using APCVD and layer 104 can be deposited using a different method such as vacuum deposition.

Vacuum deposition, such as sputtering, may be used to deposit layers 102, 103, and 104. Substrate 101 may be flexible or rigid. For example, substrate 101 may be in the form of a roll of a polymeric material. In this case, layers 102, 103, and 104 may be coated sequentially on a web line.

Alternatively, the different layers of optical film 100 can be solvent coated or cast and cured. For example, the layers may be roll coated on a roll of flexible polymeric substrate. Such method is particularly advantageous where transparent conductive film is a transparent organic conductor. In this case, layers 102, 103, and 104 may be sequentially coated and dried/cured on substrate 101.

Optical film 100 is suitable for use in touch sensors and is particularly suitable for use in a capacitive touch sensor. Optical film 100 provides means by which high optical transmission, low reflection, high abrasion resistance, and optimum sheet resistance can be achieved with no or little trade-off. It will be appreciated that while a given layer in optical film 100 is designed primarily to optimize a given property, one or more secondary properties may also be optimized without compromising the primary properties. Optimization of such secondary properties can be by design or incidental or consequential to the primary objective. For example, in a given application where transparent conductive film 102 is designed primarily to provide clarity and optical conductivity, the thickness of layer 102 can be such that the layer also reduces interfacial reflections. As another example, in an application where abrasion resistant film 103 is designed primarily to provide sufficient abrasion, the film thickness can be such that the film also reduces reflection without compromising the primary intended property of resistance to abrasion.

Optical film 100 may further include anti-glare properties by optically diffusing a reflected light. Four such exemplary embodiments according to different aspects of the present invention are shown in FIGS. 8A–8D. Optical film 800A in FIG. 8A includes a substrate 801A with a substantially smooth surface 801A', a transparent conductive film 802A with a substantially smooth surface 802A', an abrasion resistant film 803A with a substantially smooth surface 803A', an anti-reflective film 804A with a substantially smooth surface 804A', and an anti-glare film (anti-glare film) 805A with a diffuse surface 805A'. Layers 801A–804A are similar to the layers in optical film 100 described in reference to FIG. 1.

Anti-glare film 805A is designed primarily to reduce specular reflection to a desired level for a particular application, for example, by diffusing the reflected light. According to FIG. 8A, anti-glare film 805A reduces glare by virtue of a matte surface 805A'. anti-glare film 805A may further include bulk diffusion properties, for example, by incorporating particles having an index of refraction different than their surrounding material. Matte surface 805A' may be generated in a number of ways. For example, the surface may be generating by embossing layer 805A against a matte tool. Alternatively, the matte surface may be generated by appropriately choosing deposition parameters as film 805A is deposited. For example, where anti-glare film 805A is solvent coated, drying conditions can be chosen to result in a matte surface 805A' upon drying. Alternatively, anti-glare film 805A can be coated using vacuum deposition, CVD, or APCVD in such a way that the resulting film has a matte surface. Alternatively, anti-glare film 805A can include a coating of particles dispersed in a host material, where the particles impart a matte surface to the film by, for example, partially protruding through the host material. As yet another example, matte surface 805A' may be generated by casting and curing film 805A against a textured tool. Alternatively, anti-glare film 805A can be constructed by spraying a material such a sol gel, for example, in the form of droplets, onto film 804A. The sprayed material can be the same as that of film 804A.

Figure 8A:
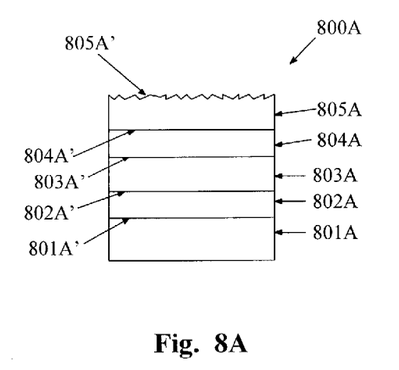
FIGS. 8A–8D illustrate schematic side views of four optical components in accordance with other embodiments of the invention.
Figure 8B:
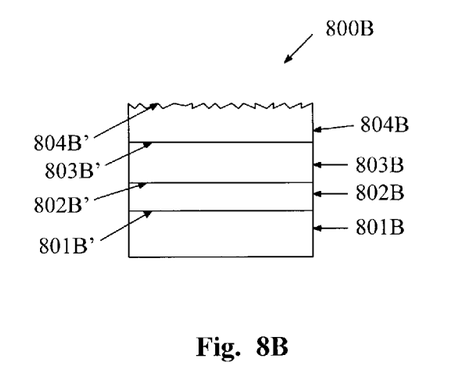

According to FIG. 8A, optical film 800A has anti-glare properties by virtue of an additional film 805A. Alternatively, an anti-glare property can be achieved by roughening surface of anti-reflective film 104 of FIG. 1. This is shown in FIG. 8B. Optical film 800B in FIG. 8B includes a substrate 801B with a substantially smooth surface 801 B', a transparent conductive film 802B with a substantially smooth surface 802B', an abrasion resistant film 803B with a substantially smooth surface 803B', and an anti-reflective film 804B with a matte surface 804B'. Layers 801B–803B are analogous to the layers in optical film 100 described in reference to FIG. 1. In this construction anti-reflective film 804B which is designed primarily to reduce reflection has the added anti-glare property because of surface 804B'. The anti-glare property is achieved with little or no compromise in the primary objective of film 804B.

Figure 8C:
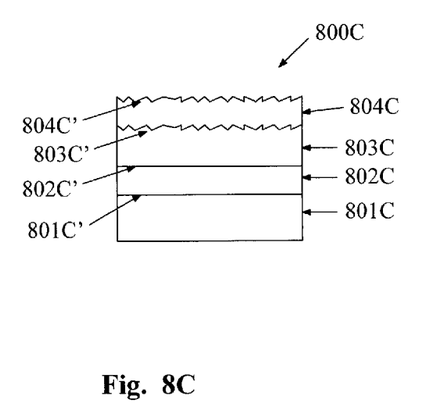

FIG. 8C illustrates another embodiment of the present invention. Optical film 800C in FIG. 8C includes a substrate 801C with a substantially smooth surface 801C', a transparent conductive film 802C with a substantially smooth surface 802C', an abrasion resistant film 803C with a matte surface 803B', and an anti-reflective film 804C with a matte surface 804C'. Layers 801C–802C are analogous to the layers in optical film 100 described in reference to FIG. 1. In optical film 800C, abrasion resistant film 803C is designed primarily to provide sufficient abrasion resistance abrasion resistant film 803C also has a matte surface 803C'.

When anti-reflective film film 804C is substantially conformally coated onto layer 803C, a matte surface 804C' is created which provides anti-glare properties for optical film 800C. This construction is particularly suitable, for example, where it is easier or more advantageous to generate a matte finish directly in layer 803C than in layer 804C. In optical film 800C, a matte surface is generated directly in layer film 803C and indirectly in layer 804C by a substantially conformal coating of layer 804C onto layer 803C.

Figure 8D:
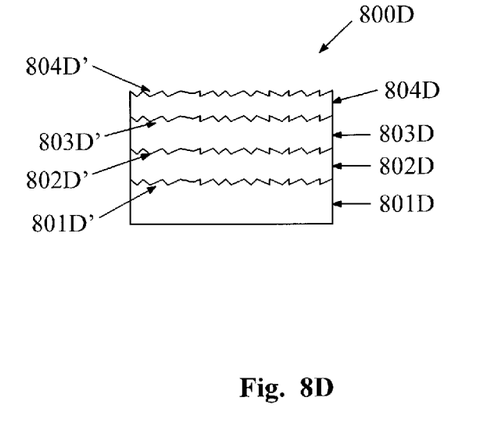

FIG. 8D shows an optical film 800D according to yet another aspect of the present invention. Optical film 800D includes a substrate 801D with a matte surface 801D', a transparent conductive film 802D with a matte surface 802D', an abrasion resistant film 803D with a matte surface 803D', and an anti-reflective film 804D with a matte surface 804D'. In optical film 800D, first a matte surface 801D' is generated directly in substrate 801D. For example, matte surface 801D' can be generated during the manufacturing of substrate 801 D. Next, layers 802D–804D (similar to layers 802C–804C) are sequentially and substantially conformally coated resulting in a matte surface 804D' in the anti-reflection layer 804D. For example, where substrate 801D is glass, surface 801D' may be generated using chemical etching. Alternatively, surface 801D' can be generated when the glass substrate is manufactured, for example, by forming the glass against a textured tool. Next, all the other layers may be sequentially and conformally coated, at elevated temperatures, on the hot glass substrate by, for example, using an APCVD method. Hence, using APCVD, optical film 800D can be manufactured with low cost and with desired optical transmission, reflection, glare, abrasion resistance, and electrical-conductivity.

It will be appreciated that the sequence or order of the different layers in FIG. 8 may be changed according to application. For example, in FIG. 8D, abrasion resistant film 803D may be deposited on substrate 801D before depositing transparent conductive film 802D.

Figure 2:
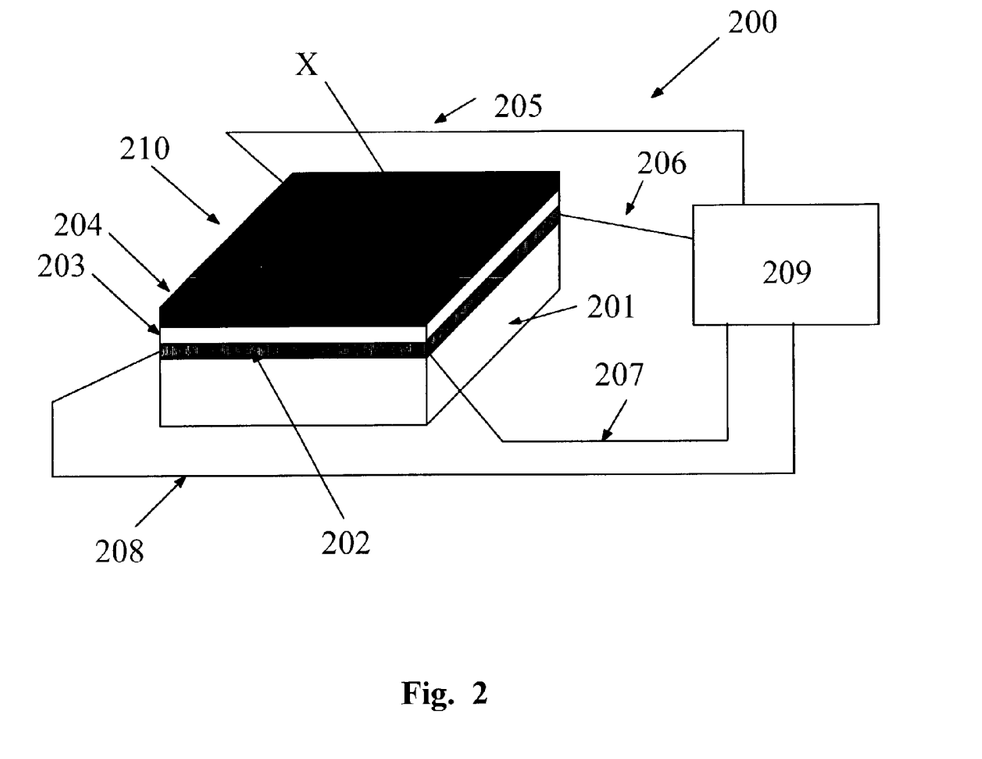
FIG. 2 illustrates a schematic three dimensional view of a touch sensor in accordance with another embodiment of the invention.

FIG. 2 schematically illustrates a capacitive touch sensor 200 in accordance with an embodiment of the present invention. Capacitive touch sensor 200 includes a touch panel 210, electrical leads 205, 206, 207, 208, and electronic circuitry 209. Touch panel 210 includes a substrate 201, a transparent conductive film 202, an abrasion resistant film 203, and an anti-reflective film 204. The layers in touch panel 210 are similar to those described in reference to optical film 100 of FIG. 1. Touch panel 210 is a capacitive touch panel. Electrical leads 205, 206, 207, and 208 electrically connect the four corners of transparent conductive film 202 to electronic circuitry 209. Electronic circuitry 209 includes electronics and software for determining a location of a touch and processing the collected information as desired in a given application. Electronic circuitry 209 further includes software for providing an application dependant user menu and for processing information. As an example, when a user applies a finger touch to touch panel 210 at location X, current flows through the four corners of transparent conductive film 202. This current capacitively couples to the user's finger or other conductive touch implement. Electronic circuitry 209 then determines the location of the touch by comparing the relative magnitudes of currents flowing through the four leads connected to the four corners of transparent conductive film 202.

Touch panel 210 can also include a pattern of resistors to linearize the electrical field across the panel, which pattern is not shown in FIG. 2 for simplicity and without any loss of generality. One such linearization method is described in U.S. Pat. No. 4,371,746.

Touch panel 210 can provide increased transmission, reduced reflection, and optimized abrasion resistance with no or little trade off. Substrate 201 is preferably optically transmissive and is designed to provide mechanical rigidity or flexibility as required in an application. Transparent conductive film 202 is designed to primarily provide optical clarity and a desired sheet resistance. Abrasion resistant film 203 is designed to primarily make touch panel 210 resistant to abrasion. Such abrasion may occur, for example, when a user touches the panel with a hard or rough stylus, or with repeated touches. Abrasion resistance is important to protect the transparent conducting film 202, and to maintain optical, electrical, and cosmetic properties of touch panel 210 during its expected lifetime. Anti-reflective film 204 is designed to primarily reduce reflection, thereby reducing glare and increasing contrast. Anti-reflective film 204 may be a single layer or a multilayer. Each layer in anti-reflective film 204 typically has a pre-determined optical thickness, for example, close to a quarter of a wavelength, for example, in the visible region. Each layer may further be organic or inorganic. It will be appreciated that according to the present invention, properties of touch panel 210 such as optical transmission, sheet resistance, abrasion resistance, and reduced reflection can each be independently tuned to a desired level with no or little need for a trade off. It will further be appreciated that touch panel 210 in FIG. 2 can be constructed analogously to the embodiments described in reference to FIGS. 8A–8D or any other suitable embodiment with accordance to the present invention.

Figure 3:
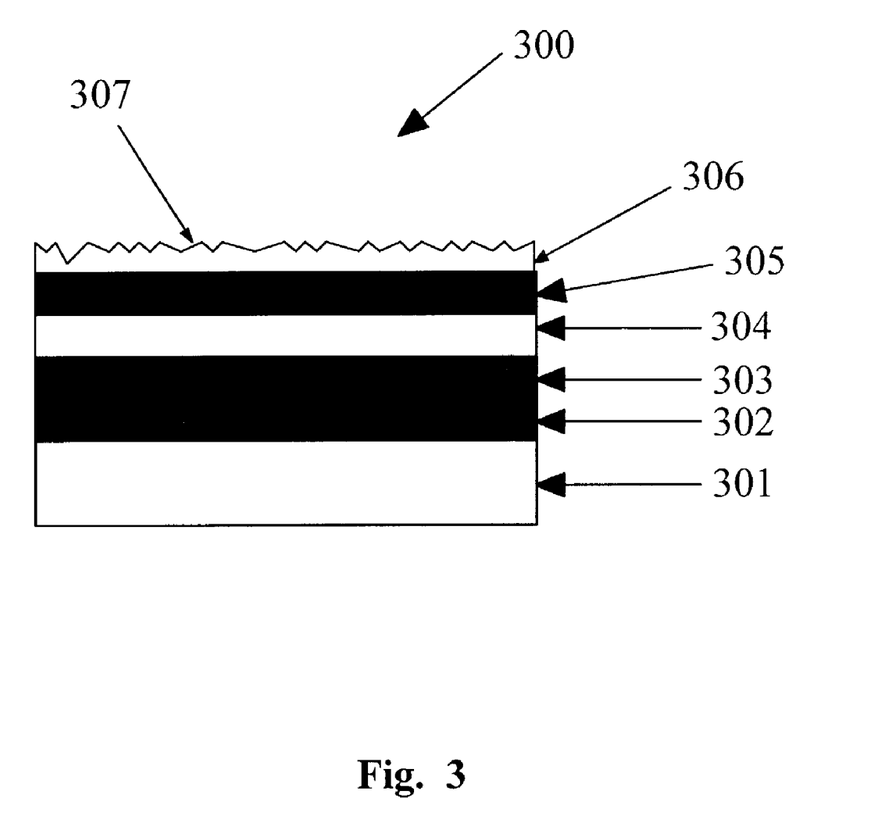
FIG. 3 illustrates a schematic side view of an optical component in accordance with another embodiment of the invention.

FIG. 3 illustrates a schematic cross-section of an optical film 300 in accordance with another embodiment of the present invention. Optical film 300 includes a substrate 301, a transparent conductive film 303 designed primarily to provide optical clarity and electrical conductivity, an abrasion resistant film 304 designed to primarily provide anti-abrasion properties, an anti-reflective film 305 designed to primarily reduce reflection, and an anti-glare film 306 designed primarily to reduce or eliminate glare. Optical film 300 further includes a barrier film 302 designed to primarily isolate transparent conductive film 303 from substrate 301. Such isolation can be desired to reduce or eliminate potential undesired interactions between substrate 301 and transparent conductive film 303. One such interaction may be chemical reaction between substrate 301 and transparent conductive film 303 that may adversely affect, for example, optical and/or electrical properties of transparent conductive film 303. As another example, substrate 301 may include particles or impurities which, in the absence of barrier film 302, could migrate into transparent conductive film 303, thereby adversely affect electrical and/or optical properties of transparent conductive film 303. Such migration may occur during processing and manufacturing of optical film 300, during assembly, during use, or for other reasons. Barrier film 302 stops or reduces such migration. For example, substrate 301 may be glass having impurities such as sodium, and transparent conductive film 303 may be a transparent conductive oxide (TCO). Examples of a TCO include indium tin oxide (ITO), fluorine doped tin oxide, antimony tin oxide (ATO), and zinc oxide (ZnO), for example, doped with aluminum. In the absence of barrier film 302, impurities in the glass can migrate into the TCO, thereby increasing its sheet resistance and/or reducing its optical clarity. Such migration may, for example, occur at elevated temperatures over a short time, or at lower temperatures over a longer time period. For example, a TCO is typically deposited at elevated temperatures, for example, 150° C. or more. At such temperatures impurities can migrate from the substrate into the deposited TCO film, thereby reducing its conductivity and/or optical clarity. Furthermore, electrical and optical properties of a TCO film can be improved if the film is baked at an elevated temperature subsequent to deposition of the film. The post deposition bake is sometimes referred to as annealing. In the absence of a barrier film, impurities may migrate from the substrate into a TCO film during annealing even if the TCO film was initially deposited at low temperatures. In the absence of barrier film 302, it may be desirable for substrate 301 to be substantially free of impurities. Impurity free substrates limit the choice of substrate and increase the cost. Adding barrier film 303 allows use of glass with impurities, such as float glass.

Anti-glare film 306 is primarily designed to diffuse residual reflection, thereby further reducing or eliminating glare. Anti-glare film 306 may have anti-glare properties by virtue of having a rough surface 307. Such rough surface may be generated while depositing anti-glare film 306, for example, by optimizing coating and drying conditions. Surface 307 may also be generated using other methods including embossing, microreplication, spraying, or other methods. Alternatively, anti-glare film 307 may include a bulk diffuser that imparts a textured surface to the film. It will be appreciated that, alternatively, optical film 300 can have anti-glare properties by incorporating a construction similar to those described in reference to FIGS. 8A–8D.

It will further be appreciated that optical film 300 provides desired optical transmission, sheet conductivity, reflection, glare, and abrasion resistance with no or little trade off. Furthermore, optical film 300 allows high temperature processing, for example, in vacuum or in close to atmospheric pressure environment, by virtue of isolating transparent conductive film 303 from substrate 301. In addition, one or more of layers 304–306 can contribute to protecting the transparent conducting film 303 from undesired effects such as oxidation, impurities that may exist in air, and other potentially undesired effects during further processing. Optical film 300 is suitable for use in a touch sensor. For example, the optical film may be used in a capacitive touch sensor similar to the circuit shown in FIG. 2.

Figure 4:
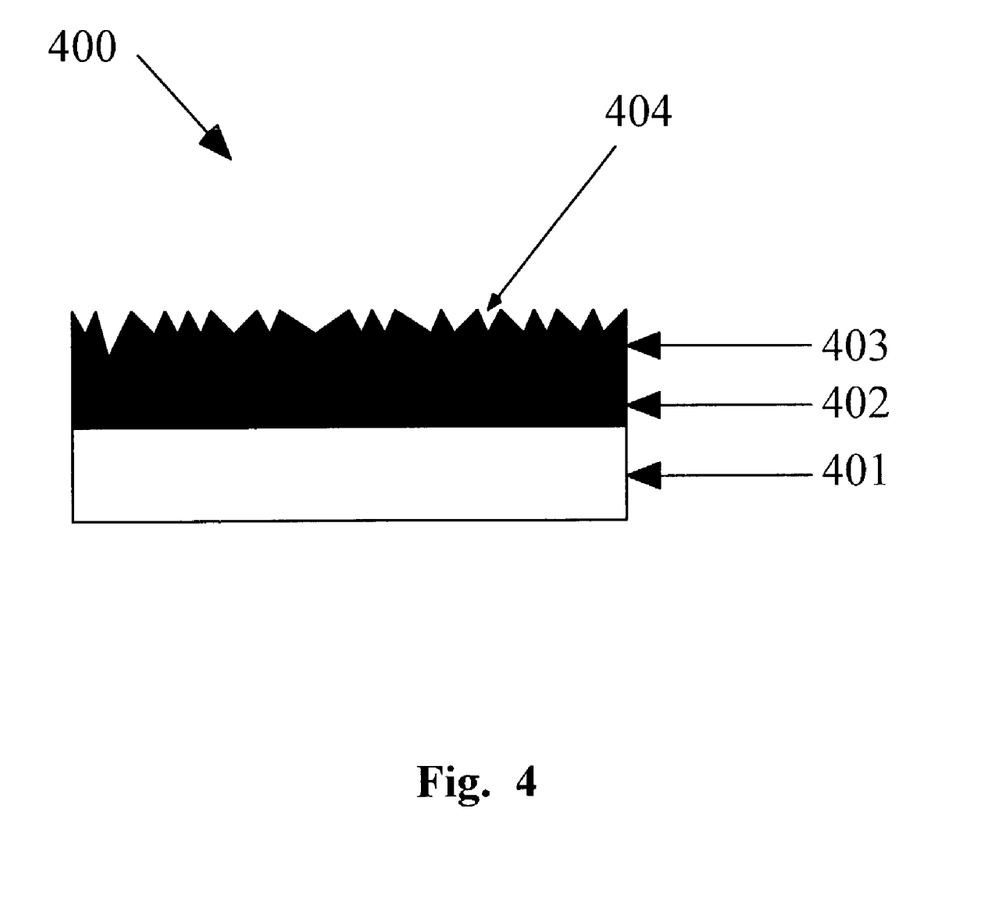
FIG. 4 illustrates a schematic side view of an optical component in accordance with yet another embodiment of the invention.

FIG. 4 describes a schematic cross-section of an optical film 400 in accordance with another embodiment of the present invention. Optical film 400 includes a substrate 410, a transparent conductive film 403 designed primarily to provide optical clarity and electrical conductivity, and a barrier film 402 designed primarily to isolate substrate 401 from transparent conductive film 403. The different layers in optical film 400 are similar to those described in the embodiment described in reference to FIG. 3. Transparent conductive film 403 has a textured surface 404 to reduce glare. Hence, in this particular embodiment of the present invention the transparent conductive film has the secondary anti-glare property without compromising the primary properties of optical clarity and sheet conductivity. Textured surface 404 can be created during deposition of transparent conductive film 403. For example, in a vacuum deposition of transparent conductive film 403, the deposition parameters may be chosen to result in a final rough surface 404. Alternatively, the surface can be roughened by a post-deposition dry or wet chemical or mechanical etch. Alternatively, (CVD) or (APCVD) can be used to deposit transparent conductive film 403 with a finished rough surface 404. For example, barrier film 403 can be deposited, using APCVD, on a hot glass substrate 401. Next, transparent conductive film 403 can be deposited, using APCVD, on a hot barrier film 402 and substrate 401. It will be appreciated that each film in FIG. 4 can include more than one layer.

As discussed previously, a particular advantage of APCVD is that most or all layers of optical film 400 can be deposited at atmospheric pressure and at elevated temperatures. Such processing conditions generally reduce cost and improve optical and electrical performance. Furthermore, layers can be coated sequentially on the same manufacturing line to further reduce cost. Another particular advantage of APCVD is that the layers can be coated on the same line the glass substrate 401 is produced, thereby further reducing cost. Barrier film 402 reduces or eliminates migration of impurities from substrate 401 to transparent conductive film 403. Thus, inexpensive glass with impurities may be used to produce the glass substrate. Barrier film 402, by blocking migration of impurities from the substrate, allows deposition of transparent conductive film 403 at elevated temperatures without compromising optical and electrical properties of the conductor. It will be appreciated that, according to the present invention, optical film 400 may have other layers such as an abrasion resistant film designed primarily to increase resistance of optical film 400 to abrasion. It will further be appreciated that, similar to the discussion in reference to FIG. 8, matte surface 404 may be generated directly in transparent conductive film 403, or indirectly, by for example, first generating a matte surface directly in barrier film 402, and then substantially conformally coating a transparent conducting film onto barrier film 402 resulting in a matte surface 404.

Figure 5:
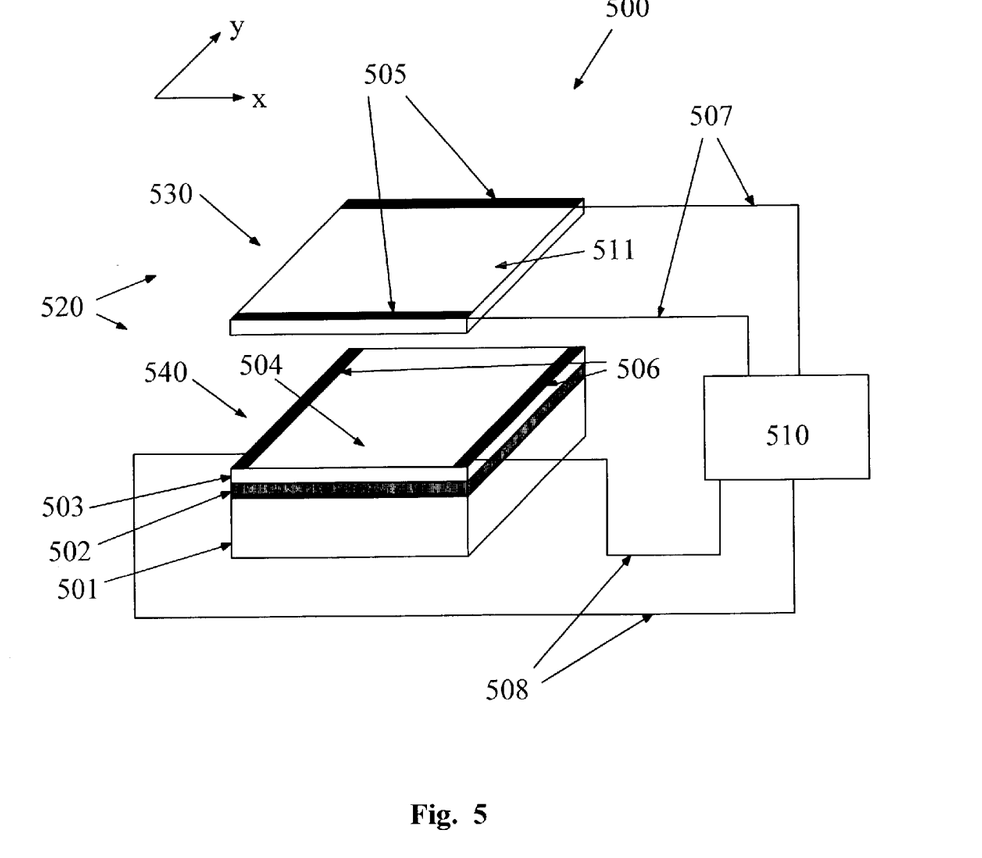
FIG. 5 illustrates a schematic three dimensional view of a touch sensor in accordance with another embodiment of the invention.

FIG. 5 illustrates a schematic of a resistive touch sensor 500 in accordance with another aspect of the present invention. Resistive touch panel 500 includes a top sheet 530 and a bottom sheet 540. Top sheet 530 includes a transparent conductor 511 that faces the bottom sheet. Electrodes 505 make electrical contact with transparent conductor 511. Bottom sheet 540 includes a substrate 501, a transparent conductive film 503 designed primarily to provide optical clarity and sheet conductivity, and a barrier film 502 designed primarily to isolate substrate 501 from transparent conductive film 503. The top surface of transparent conductive film 503 (surface 504) can be rough or textured. Electrodes 506 are in electrical contact with transparent conductive film 503. Leads 507 and 508 connect top transparent conductor 511 and bottom transparent conductor 503 to electronic circuitry 510.

An applied touch brings top and bottom transparent conductors, 511 and 503, into physical contact with one another at the location of touch. Touch location is determined by first energizing electrodes 505 and using conductor 503 to determine the y-coordinate of the touch location. Next, electrodes 506 are energized and top sheet conductor 511 is used to determine the x-coordinate of the touch location.

Bottom sheet 540 provides a desired optical clarity and sheet conductivity. The roughened surface 504 reduces or eliminates glare. In addition, matte surface 504 reduces or eliminates optical interference between top and bottom sheets, especially at or near a location of a touch. Such an optical interference is sometimes referred to as Newton's rings and is, generally, apparent to a viewer. Newton's rings are generally undesirable because they reduce contrast and interfere with easy viewing of information displayed through touch sensor 500. Roughened surface 504 reduces Newton's rings to an acceptable level or eliminates them. It will be appreciated that, according to the present invention, touch sensor 500 provides desired optical clarity, glare, substantially invisible Newton's rings, desired sheet resistance, and reduced manufacturing cost with little or no trade off.

Figure 6:
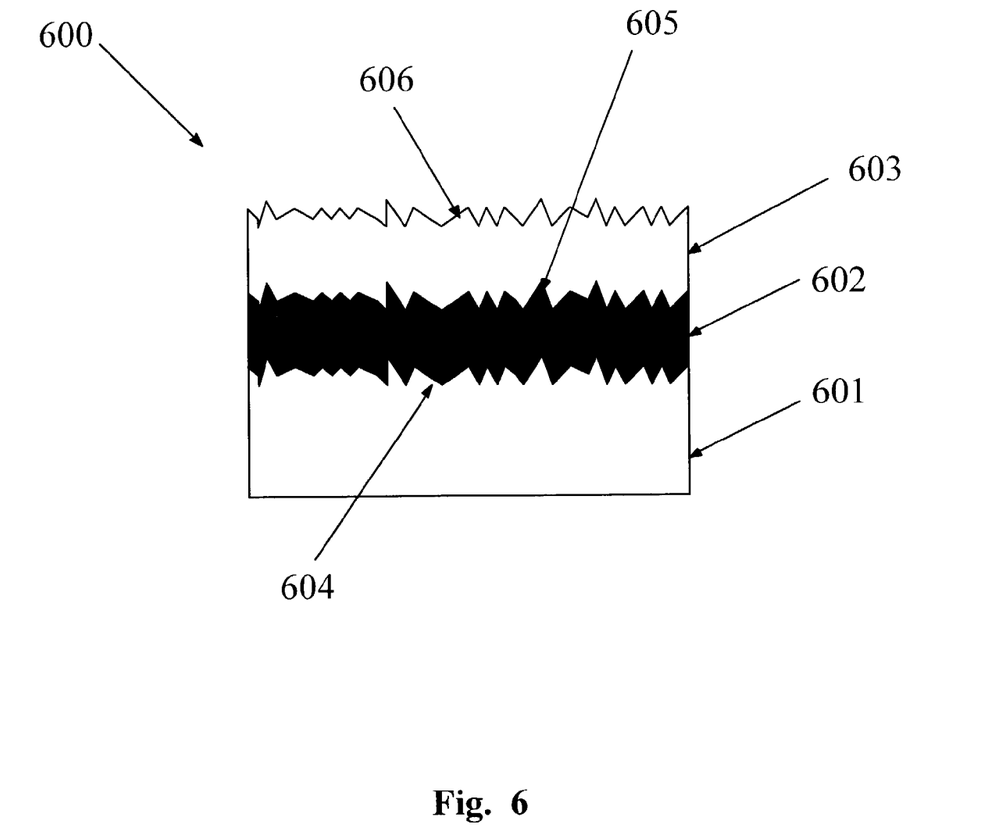
FIG. 6 illustrates a schematic side view of an optical component in accordance with another embodiment of the invention.

FIG. 6 illustrates a schematic cross-section of an optical film 600 in accordance with another embodiment of the present invention. Optical film 600 includes a substrate 601 with a rough top surface 604, a barrier film 602 with a rough top surface 605, and a transparent conductive film 603 with a rough top surface 606. Transparent conductive film 603 is designed primarily to provide optimum optical clarity and sheet conductivity. Transparent conductive film 603 also has a secondary antiglare property by virtue of matte surface 606. Barrier film 602 is designed primarily to isolated transparent conductive film 603 from substrate 601, and has a secondary antiglare property. Glare in optical film 600 is reduced or eliminated by virtue of diffuse surfaces 604, 605, and 606. Optical film 600 is suitable for use in a touch sensor and provides desired optical clarity, glare, isolation of a transparent conducting film from a substrate, and reduced manufacturing cost with little or no trade off. Optical film 600 can be made by first creating a diffuse surface 604 in substrate 601. Next, barrier film 602 is substantially conformally deposited onto substrate 601 so that top surface 605 of barrier film 602 is also roughened or textured. Surfaces 604 and 605 can be similar to one another in texture and level of roughness.

Alternatively, diffuse properties of surfaces 604 and 605 may be different. Transparent conductive film 603 is then substantially conformally deposited onto barrier film 602 so that top surface 606 of transparent conductive film 603 is also roughened or textured. Surfaces 604, 605, and 606 can be similar in texture and level of roughness. Alternatively, these surfaces can be different in texture and/or degree of roughness.

Optical film 600 is particularly suitable, for example, where it is advantageous to create a diffuse surface in the transparent conducting film by first generating a rough surface in a substrate and subsequently coating the substrate with a barrier layer and a transparent conducting film in such a manner that the roughness in the substrate, at least to some degree, duplicates in the coated layers. For example, in some applications it may be difficult or less advantageous to directly create a rough surface in the transparent conducting film 606. In such cases, such rough surface can be generated indirectly by creating a rough surface in a substrate and replicating the rough surface by conformally coating the other layers onto the substrate.

It will be appreciated from FIG. 6 that, alternatively, surface 604 of substrate 601 may be substantially smooth. In this case, a rough surface can be created directly in barrier film 602, and replicated into transparent conductive film 603 by substantially conformally coating transparent conductive film 603 onto barrier film 602.

Barrier film 602 reduces or eliminates undesired interaction between substrate 601 and transparent conductive film 603. For example, barrier film 602 can reduce or eliminate migration of impurities. Alternatively, barrier film 602 can reduce or eliminate chemical reaction. In general, barrier film 602 isolates transparent conductive film 603 from substrate 601. The isolation eliminates or reduces an undesired interaction that would, in the absence of the barrier film, affect the performance of the substrate and/or the transparent conducting film.

APCVD can be used to manufacture the multilayer optical film 600. For example, a glass substrate 601, such as a float glass, can be manufactured using a conventional glass manufacturing process. Next, a coating of barrier film 602 is applied to the hot glass substrate. The coating temperature may exceed 400° C. The coating may be applied to the glass in a float bath or after it is removed from the bath. The barrier film conformally coats the glass such that a textured surface 605 results in the barrier film. Next, a transparent conducting film 603 is coated onto the barrier film. The conductive coating may also be applied in the float bath and the coating temperature may exceed 500° C. APCVD is particularly advantageous for manufacturing optical film 600 because some or all layers can be manufactured on the same line and at elevated temperatures. Therefore, manufacturing cost is reduced. Furthermore, performance of the layers can be improved when deposited at elevated temperatures.

Alternatively, when advantageous, CVD or a combination of CVD and APCVD can be used to manufacture optical film 600. For example, barrier film 602 may be coated onto substrate 601 using APCVD and transparent conductive film 603 may be coated using CVD. The coatings can be done on the same manufacturing line. Other suitable methods can also be used for coating the layers. For example, transparent conductive film 603 can be a transparent organic conductor. In this case, the organic conductor can be coated onto barrier film 602 using knife coating, screen printing, inkjet printing, or any other suitable coating method.

Substrate 601 may be rigid or flexible. The substrate may be polymeric or any type of glass. For example, the substrate may be float glass, or it may be made of organic materials such as polycarbonate, acrylate, and the like. Barrier film 602 may be silicon dioxide or tin oxide. Transparent conducting film may be a semiconductor, doped semiconductor, semi-metal, metal oxide, an organic conductor, a conductive polymer, and the like. Exemplary inorganic materials include transparent conductive oxides, for example (ITO), fluorine doped tin oxide, (ATO), and the like. Exemplary organic materials include conductive organic metallic compounds as well as conductive polymers such as polypyrrole, polyaniline, polyacetylene, and polythiophene, such as those disclosed in European Patent Publication EP-1-172-831-A2.

Figure 7:
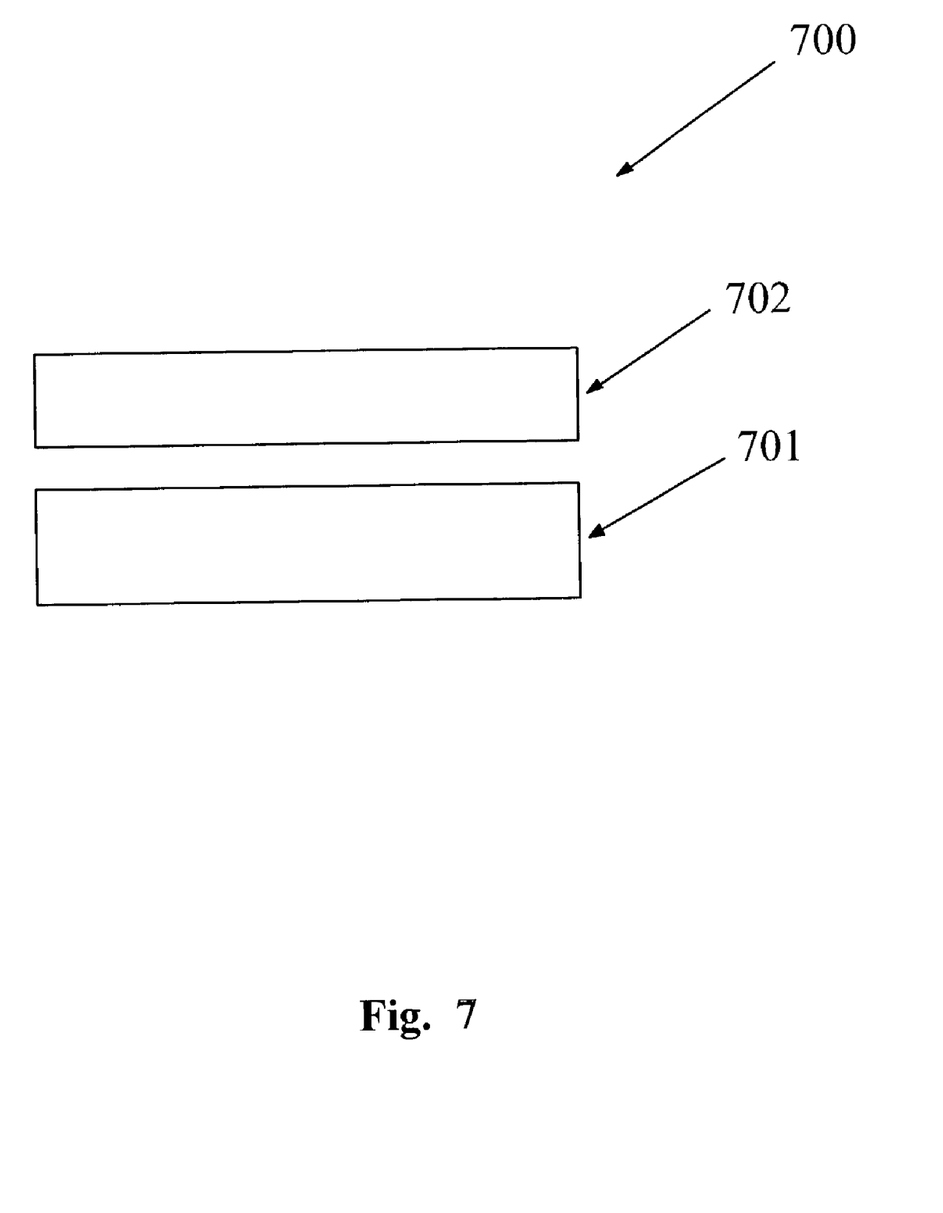
FIG. 7 illustrates a schematic side view of a display system in accordance with another embodiment of the invention.

FIG. 7 illustrates a schematic cross-section of a display system 700 in accordance with one aspect of the present invention. Display system 700 includes a display 701 and a touch sensor 702. Touch sensor 702 includes an optical film according to an embodiment of the present invention. For example, touch sensor 702 can include optical film 100 of FIG. 1, optical film 300 of FIG. 3, optical film 600 of FIG. 6, optical films of FIGS. 8A–8D, or any other optical film in accordance with the present invention. Display 701 can include permanent or replaceable graphics (for example, pictures, maps, icons, and the like) as well as electronic displays such as liquid crystal displays, cathode ray tubes, plasma displays, electroluminescent displays, organic electroluminescent displays, electrophoretic displays, and the like. It will be appreciated that although in FIG. 7 display 701 and touch sensor 702 are shown as two separate components, the two can be integrated into a single unit.

All patents, patent applications, and other publications cited above are incorporated by reference into this document as if reproduced in full. While specific examples of the invention are described in detail above to facilitate explanation of, various aspects of the invention, it should be understood that the intention is not to limit the invention to the specifics of the examples. Rather, the intention is to cover all modifications, embodiments, and alternatives falling within the spirit and scope of the invention as defined by the appended claims.

What is claimed is:

1. A capacitive touch sensor comprising:
a glass substrate;
a transparent conductive film disposed on the substrate and configured for detecting a touch by capacitively coupling to a conductive touch object;
a barrier film disposed between the substrate and the transparent conductive film and configured to isolate the transparent conductive film from impurities present in the glass substrate;
an antiglare coating disposed over the transparent conductive film; and
electrical leads connecting the transparent conductive film to electronic circuitry for determining location of the touch.

2. The capacitive touch sensor of claim 1, further comprising an antireflective film disposed between the transparent conductive film and the antiglare coating.

3. The capacitive touch sensor of claim 1, wherein the glass substrate is a float glass substrate.

4. The capacitive touch sensor of claim 1, wherein the antiglare coating incorporates particles.

5. The capacitive touch sensor of claim 1, wherein the antiglare coating is formed by spraying.

6. The capacitive touch sensor of claim 1, wherein the antiglare coating comprises silicon dioxide.

7. The capacitive touch sensor of claim 1, wherein the transparent conductive film comprises indium tin oxide.

8. The capacitive touch sensor of claim 1, wherein the transparent conductive film comprises fluorine doped tin oxide.

9. The capacitive touch sensor of claim 1, wherein the transparent conductive film comprises antimony tin oxide.

10. The capacitive touch sensor of claim 1, wherein the transparent conductive film comprises zinc oxide.

11. The capacitive touch sensor of claim 1, wherein the barrier film comprises silicon dioxide.

12. The capacitive touch sensor of claim 1, wherein the barrier film comprises tin oxide.

13. The capacitive touch sensor of claim 1, further comprising an abrasion resistant film for resisting abrasion to the capacitive touch sensor due to repeated touch inputs.

* * * * *